(12) United States Patent
Sane et al.

(10) Patent No.: US 8,346,274 B2
(45) Date of Patent: Jan. 1, 2013

(54) METHOD TO CONTROL MULTIPLE RADIO ACCESS BEARERS IN A WIRELESS DEVICE

(75) Inventors: Sachin J. Sane, Fremont, CA (US); Jianxiong Shi, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 12/785,350

(22) Filed: May 21, 2010

(65) Prior Publication Data

US 2011/0286387 A1 Nov. 24, 2011

(51) Int. Cl.
H04W 72/00 (2009.01)
(52) U.S. Cl. ............... 455/452.2; 455/442; 455/445; 455/436; 455/443; 455/450
(58) Field of Classification Search ......... 455/436–445, 455/450, 452.1, 452.2; 370/353, 354, 328
See application file for complete search history.

(56) References Cited

U.S. PATENT DOCUMENTS

| 7,209,747 | B2 | 4/2007 | Chen |
| 7,382,750 | B2 | 6/2008 | Wu |
| 2006/0058032 | A1* | 3/2006 | Pearce et al. ............... 455/444 |
| 2008/0225893 | A1 | 9/2008 | Cave et al. |
| 2008/0280612 | A1 | 11/2008 | Bornier et al. |
| 2009/0046593 | A1* | 2/2009 | Ptasinski et al. ............ 370/252 |
| 2009/0109959 | A1* | 4/2009 | Elliott et al. ................ 370/352 |
| 2009/0296654 | A1 | 12/2009 | Bennett et al. |
| 2011/0216694 | A1* | 9/2011 | Plasberg et al. ............. 370/328 |

FOREIGN PATENT DOCUMENTS

| EP | 1 689 130 A1 | 8/2006 |
| WO | WO 01/063955 | 8/2001 |
| WO | WO 2005/112500 | 11/2005 |

OTHER PUBLICATIONS

International Search Report for PCT Application No. PCT/US2011/034582, dated Aug. 24, 2011.
Written Opinion of the International Searching Authority for PCT Application No. PCT/US2011/034582, dated Aug. 24, 2011.
Xu, et al., "Simulation Analysis of RLC Timers in UMTS Systems," Proceedings of the 2002 Winter Simulation Conference.
Ghadialy, "A look at PDP Context in Umts networks," http://www.3g4g.co.uk/Tutorial/Zg/zg_pdp Apr. 11, 2007.

* cited by examiner

*Primary Examiner* — Kathy Wang-Hurst
(74) *Attorney, Agent, or Firm* — Gazdzinski & Associates, PC

(57) ABSTRACT

A method to control multiple radio access bearers is performed at a mobile wireless communication device when the mobile wireless communication device is connected to a radio network subsystem in a wireless communication network by first and second bidirectional radio access bearers. The mobile wireless communication device transmits a data packet on an uplink of the first bidirectional radio access bearer to the radio network subsystem. When the data packet is not correctly received by the radio network subsystem, the mobile wireless communication device retransmits the data packet repeatedly. After N retransmissions of the data packet, the mobile wireless communication device releases the first bidirectional radio access bearer while maintaining the second bidirectional radio access bearer. The first bidirectional radio access bearer provides a channel to transport packet switched data, and the second bidirectional radio access bearer provides a channel to transport circuit switched data.

14 Claims, 8 Drawing Sheets

METHOD TO CONTROL MULTIPLE RADIO ACCESS BEARERS IN A WIRELESS DEVICE

TECHNICAL FIELD

The described embodiments relate generally to wireless mobile communications. More particularly, a method is described for controlling a connection having multiple radio access bearers between a mobile wireless communication device and a wireless communication network.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem located in the cell. The radio network subsystem can include a base transceiver station (BTS) in a Global System for Communications (GSM) network or a Node B in a Universal Mobile Telecommunications System (UMTS) network. Newer mobile wireless communication devices can include the capability of providing several different communication services simultaneously, such as a voice call and data internet browsing at the same time. A separate radio access bearer can be used to transport radio link signals for each of the services between the mobile wireless communication device and one or more radio network subsystems in the wireless network. From the perspective of a user of the mobile wireless communication device, each of the communication services transported over the separate radio access bearers can be considered independent, and therefore changes to a connection through one radio access bearer should impact minimally connections using a separate radio access bearer. Certain communication protocols, such as the $3^{rd}$ Generation Partnership Project (3GPP) UMTS specifications, can treat a multiple radio access bearer connection as a single connection, resulting in multiple services changed together rather than separately.

Data usage through wireless communication networks has increased substantially with the introduction of advanced mobile wireless communication devices. As the number of data users has increased, the wireless communication networks can incur congestion and scheduling issues that affect the delivery of data to the mobile wireless communication device. In some situations, a mobile wireless communication device connected simultaneously by a voice connection and a data connection can continue to receive voice signals when no data or acknowledgements are received from the network. The mobile wireless communication device can be configured to retransmit, reset and ultimately terminate the radio link with the wireless communication network when the data connection appears unrecoverable. Terminating the radio link, however, can remove both the data connection and the voice connection, even though the voice connection can be operating properly.

Thus there exists a need to control multiple radio access bearers between a mobile wireless communication device and one or more radio network subsystems in a wireless communication network that releases connections independently.

SUMMARY OF THE DESCRIBED EMBODIMENTS

The described embodiments relate generally to wireless mobile communications. More particularly, a method is described for multiple radio access bearers between a mobile wireless communication device and one or more network subsystems in a wireless communication network.

In one embodiment, a method to control multiple radio access bearers is performed at a mobile wireless communication device when the mobile wireless communication device is connected to a wireless communication network. Initially, the mobile wireless communication device is connected to a radio network subsystem in the wireless communication network by first and second bidirectional radio access bearers. The mobile wireless communication device transmits a data packet on an uplink of the first bidirectional radio access bearer to the radio network subsystem. When the data packet is not correctly received by the radio network subsystem, the mobile wireless communication device retransmits the data packet repeatedly. After N retransmissions of the data packet, the mobile wireless communication device releases the first bidirectional radio access bearer while maintaining the second bidirectional radio access bearer. In an embodiment, the first bidirectional radio access bearer provides a channel to transport packet switched data, and the second bidirectional radio access bearer provides a channel to transport circuit switched data.

In a further embodiment, a mobile wireless communication device including a wireless transceiver to transmit and receive from a radio network subsystem in a wireless communication network signals and a processor coupled to the wireless transceiver is described. When the mobile wireless communication device is connected to the radio network subsystem by a first radio access bearer and a second radio access bearer simultaneously, the processor is arranged to execute a set of instructions. The set of instructions include transmitting a data packet on an uplink of the first radio access bearer to the radio network subsystem and retransmitting the data packet when the data packet is not correctly received by the radio network subsystem. The set of instructions also include releasing the first radio access bearer while maintaining the second radio access bearer after N retransmissions of the data packet. In another embodiment, the set of instructions further include transmitting a reset packet on the uplink of the first radio access bearer to the radio network subsystem, retransmitting the reset packet when the reset packet is not correctly received by the radio network subsystem, and after M retransmissions of the reset packet, releasing the first radio access bearer while maintaining the second radio access bearer.

In another embodiment, computer program product encoded in a computer readable medium for controlling a mobile wireless communication device connected to a radio access system in a wireless communication network by a plurality of wireless channels simultaneously is described The computer program product includes non-transitory computer program code for transmitting a data packet on a first wireless channel in the plurality of wireless channels to the radio access system. The computer program product further includes non-transitory computer program code for retransmitting the data packet when the data packet is not correctly received by the radio access system and non-transitory computer program code for, after N retransmissions of the data packet, disconnecting the first wireless channel while maintaining a connection of at least one other wireless channel in the plurality of wireless channels to the radio access system.

In a further embodiment, a method for controlling at least two simultaneous wireless connections between a mobile wireless communication device and a wireless access network is described. The method includes, at the mobile wireless communication device, transmitting and receiving circuit switched data over a first wireless connection, while simultaneously transmitting and receiving packet switched data over a second wireless connection. The method further includes determining by the mobile wireless communication device whether the transmitted packet switched data is received correctly by the wireless access network. The method additionally includes disconnecting the second wireless connection while retaining the first wireless connection with the wireless access network when the transmitted packet switched data is not received correctly by the wireless access network after multiple retransmissions by the mobile wireless communication device.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
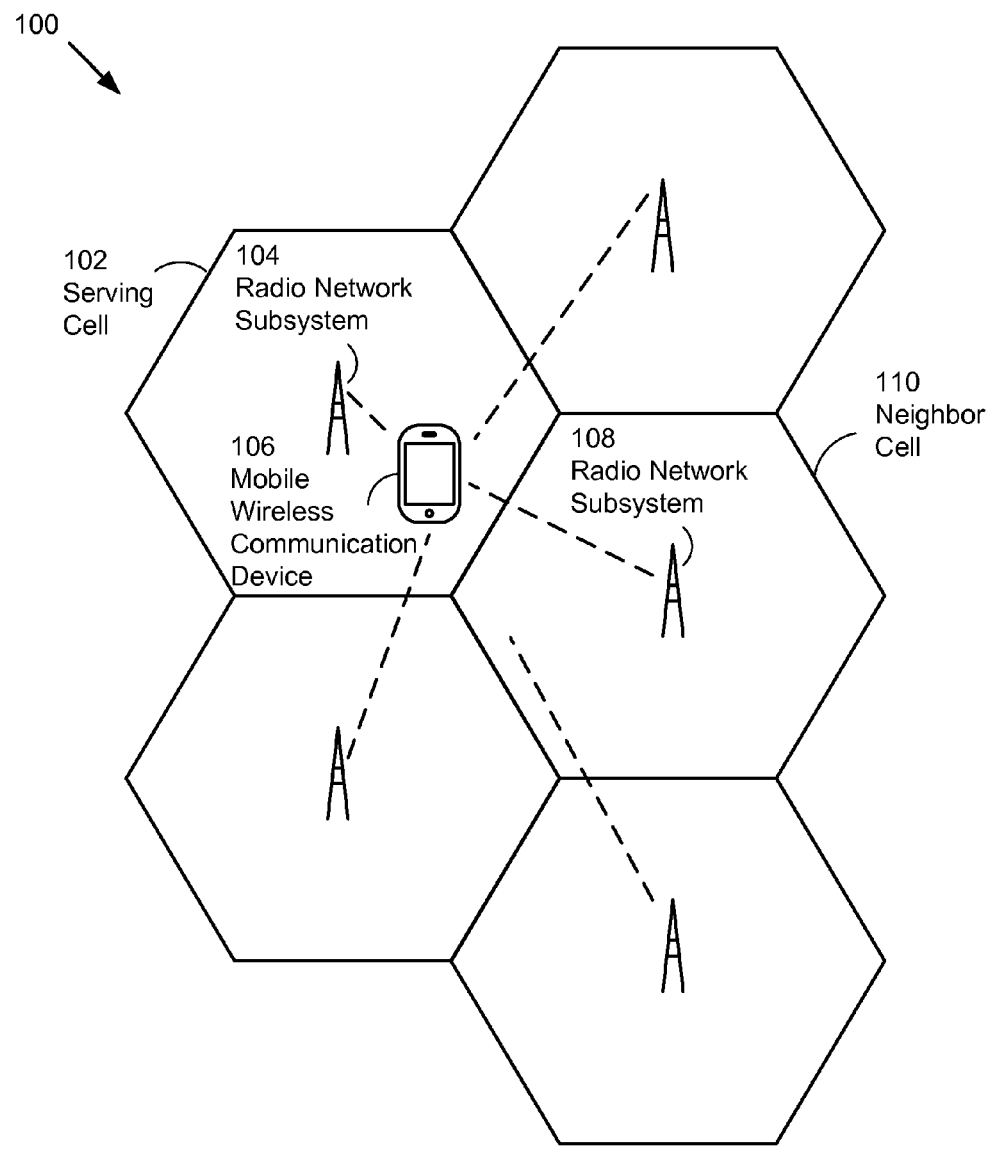
FIG. 1 illustrates a mobile wireless communication device located within a wireless cellular communication network.

FIG. 1 illustrates a wireless communication network 100 of overlapping wireless communication cells to which a mobile wireless communication device 106 can connect. Each wireless communication cell can cover a geographic area extending from a centralized radio network subsystem. The mobile wireless communication device 106 can receive communication signals from a number of different cells in the wireless communication network 100, each cell located at a different distance from the mobile wireless communication device. In a second generation (2G) wireless communication network, such as a network following a Global System for Mobile Communications (GSM) protocol, the mobile wireless communication device 106 can connect to a radio network subsystem in the wireless communication network 100 using one radio link at a time. For example, the mobile wireless communication device 106 can be connected initially to a radio network subsystem (RNS) 104 in a serving cell 102. The mobile wireless communication device 106 can monitor signals from radio network subsystems in neighbor cells. The mobile wireless communication device 106 can transfer its connection from the radio network subsystem 104 in the serving cell 102 to a radio network system 108 in a neighbor cell 110 as the mobile wireless communication device moves within the wireless communication network 100. In a third generation (3G) wireless communication network, such as a network based on a Universal Mobile Telecommunication System (UMTS) protocol, the mobile wireless communication device 106 can be connected to one or more radio network subsystems simultaneously through multiple radio access bearers. Each of the radio access bearers can transport a different communication service independently, such as a voice service on one radio access bearer and a data service on a second radio access bearer. The mobile wireless communication device 106 can be connected by multiple radio access bearers simultaneously to the radio network subsystem in the serving cell 102 (if the RNS 104 supports such a connection). The mobile wireless communication device can also be connected by a first radio access bearer to the RNS 104 in the serving cell 102 and to a second RNS 108 in the neighbor cell 110 simultaneously. Advanced mobile wireless communication devices, sometimes referred to as "smart" phones, can provide a diverse array of services to the user using a connection with multiple radio access bearers.

Figure 2:
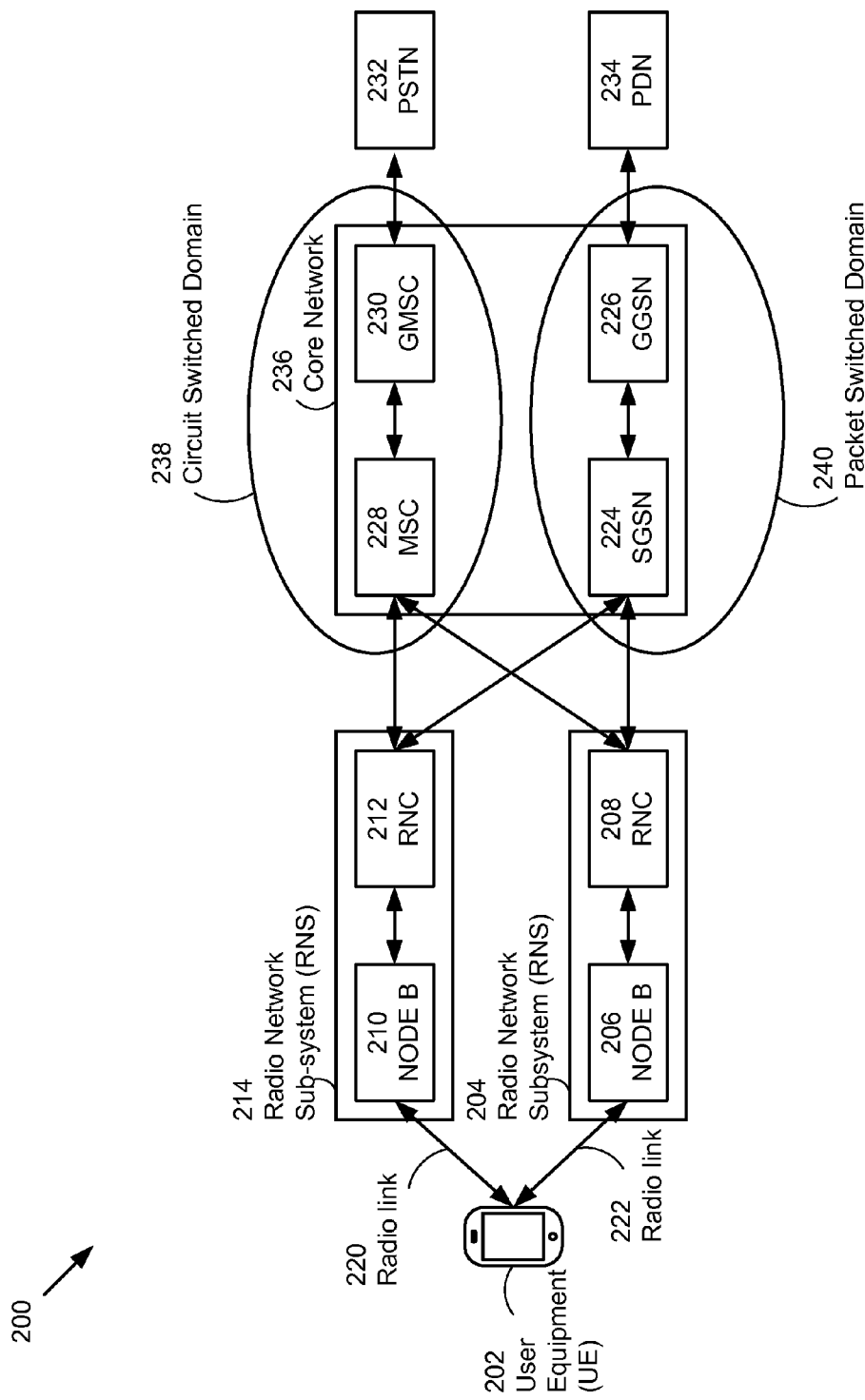
FIG. 2 illustrates a hierarchical architecture for a wireless communication network.

FIG. 2 illustrates a UMTS wireless communication network 200 including UMTS access network elements. The mobile wireless communication device 106 operating in the UMTS wireless communication network 200 can be referred to as user equipment (UE) 202. (Wireless mobile communication devices 106 can include the capability of connecting to multiple wireless communication networks that use different wireless radio access network technologies, such as to a GSM network and to a UMTS network; thus the description that follows can also apply to such "multi-network" devices as well.) In a UMTS wireless network, the UE 202 can connect to one or more radio network subsystems (RNS) 204/214 through one or more radio links 220/222. The first RNS 204 can include a radio access system, known as a "Node B" 206, which transmits and receives radio frequency signals and a radio network controller (RNC) 208 that manages communication between the "Node B" 206 and the core network 236. Similarly the second RNS 214 can include Node B 210 and RNC 212. Unlike a mobile wireless communication device 106 in a GSM network, the UE 202 in the UMTS network can connect to more than one radio network subsystem simultaneously. Each RNS can provide a connection for a different service to the UE 202, such as a voice connection through a circuit switched voice network and a data connection through a packet switched data network. Each radio link 220/222 can include one or more radio access bearers that transport signals between the UE 202 and the respective RNS 204/214. Multiple radio access bearers can be used for separate services on separate connections or for supplementing a service with additional radio resources for a given connection.

The core network 236 can include both a circuit switched domain 238 that can carry voice traffic to and from an external public switched telephone network (PSTN) 232 and a packet switched domain 240 that can carry data traffic to and from an external public data network (PDN) 234. Voice and data traffic can be routed and transported independently by each domain. Each RNS can combine and deliver both voice and data traffic to mobile wireless communication devices. The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The circuit switched domain 238 and the packet switched domain 240 of the core network 236 can each operate in parallel, and both domains can connect to different radio access networks simultaneously.

The UMTS wireless communication network 200 illustrated in FIG. 2 can support several different configurations in which the UE 202 connects through multiple radio access bearers to the wireless communication network. In a first configuration, a "soft" handoff of the UE 202 can occur between the first RNS 204 and the second RNS 214 as the UE 202 changes location within the UMTS wireless communication network 200. A first radio access bearer through the first RNS 204 can be supplemented by a second radio access bearer through the second RNS 214 before deactivating the first radio access bearer. In this case, multiple radio access bearers can be used for enhancing a connection's reliability, and the UE 202 can typically be using one service through the multiple radio access bearers. In a second configuration, the UE 202 can connect through the first RNS 204 to the packet switched domain 240 to support a packet data connection and simultaneously connect through the second RNS 214 to the circuit switched domain 238 to support a voice connection. In this case, the UE 202 can maintain a different radio access bearer for each service. In a third configuration, a single RNS can support multiple radio access bearers to the same UE 202, each radio access bearer supporting a different service. For the second and third configurations, it can be preferred that the establishment and release of each radio access bearer be independent as they can be associated with different services simultaneously.

Figure 3:
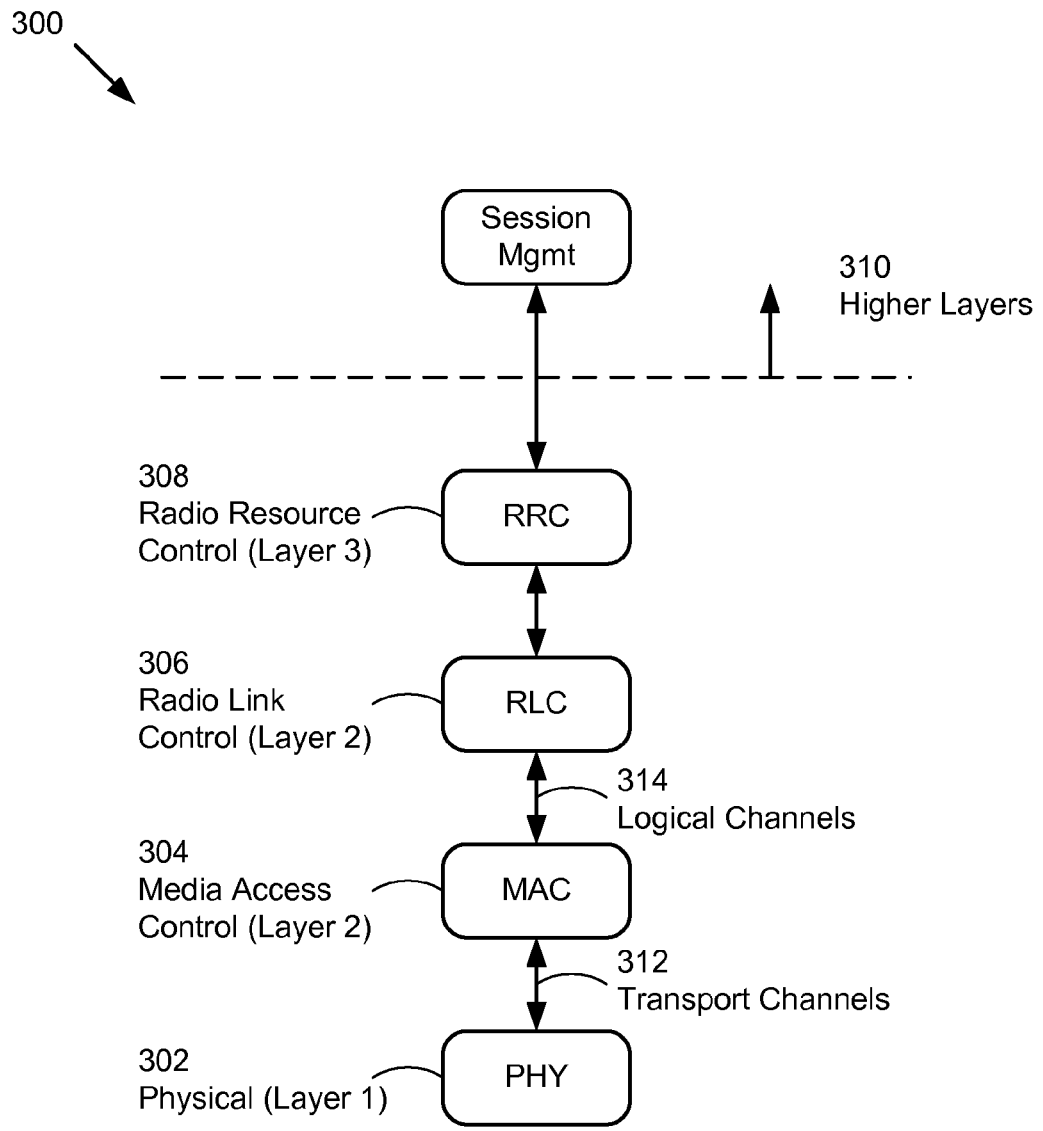
FIG. 3 illustrates a communication protocol stack for a mobile wireless communication device.

FIG. 3 illustrates a layered protocol stack 300 with which a UE 202 can establish and release connections with the UMTS wireless communication network 200 through an exchange of messages. Higher layers 310 in the layered protocol stack 300, such as a session management layer, can request a connection of the UE 202 to the wireless communication network 200. The connection request from the session management layer can result in a series of discrete packetized messages known as radio resource control (RRC) service data units (SDU) passed from an RRC processing block 308 in layer 3 of the protocol stack 300 to a radio link control (RLC) processing block 306 in layer 2 of the protocol stack 300. A layer 3 SDU can represent a basic unit of communication between layer 3 peers at each end of the communication link. Each layer 3 RRC SDU can be segmented by the RLC processing block 306 into a numbered sequence of layer 2 RLC protocol data units (PDU) for transmission over a communication link. A layer 2 RLC PDU can represent a basic unit of data transfer between layer 2 peers at each end of the communication link. Layer 2 RLC PDUs can be transmitted through additional lower layers in the layer protocol stack 300, namely a media access control (MAC) layer 304 that maps logical channels 314 into transport channels 312 and a physical layer 302 that provides a radio link "air" interface. At the receiving end of the communication link (not shown), the layer 2 RLC PDUs can be reassembled by another RLC processing block to form a complete layer 3 SDU to deliver to another RRC processing block.

The layer 2 RLC protocol can be configured to operate in an acknowledged mode to provide reliable transport of the layer 2 PDUs over a noisy transmission channel, such as a wireless communication link. If a layer 2 PDU is lost during transmission or incorrectly received, the layer 2 PDU can be retransmitted before reassembling the complete layer 3 SDU. The layer 2 RLC protocol can use an automatic repeat request (ARQ) function to trigger retransmissions. A transmitting layer 2 RLC processing block 306 can receive a status report from a receiving layer 2 RLC processing block. The status report can be sent in response to a poll from the transmitting end or can be automatically sent by the receiving end. Polling of the receiving end can be accomplished by setting a polling bit in a field of a transmitted layer 2 PDU. For example, when a polling bit can be set in a layer 2 PDU having the last sequence number for a particular layer 3 SDU. The layer 2 processing block at the receiving end can recognize the polling bit and respond to the poll by indicating the highest sequence number layer 2 PDU in the layer 3 SDU for which all layer 2 PDUs equal to or earlier than the highest sequence number have been correctly received. Alternatively, the receiving end can automatically send a status report when a layer 2 PDU is received out of sequence or incorrectly received, thus alerting the transmitting end that a layer 2 PDU has been lost or corrupted during transmission. The transmitting end can respond to the status report by retransmitting any missing layer PDUs. The segmentation and reassembly function with error checking in the RLC layer 2 processing block 306 can ensure that layer 3 RRC SDUs are transmitted and received completely and correctly.

Figure 4:
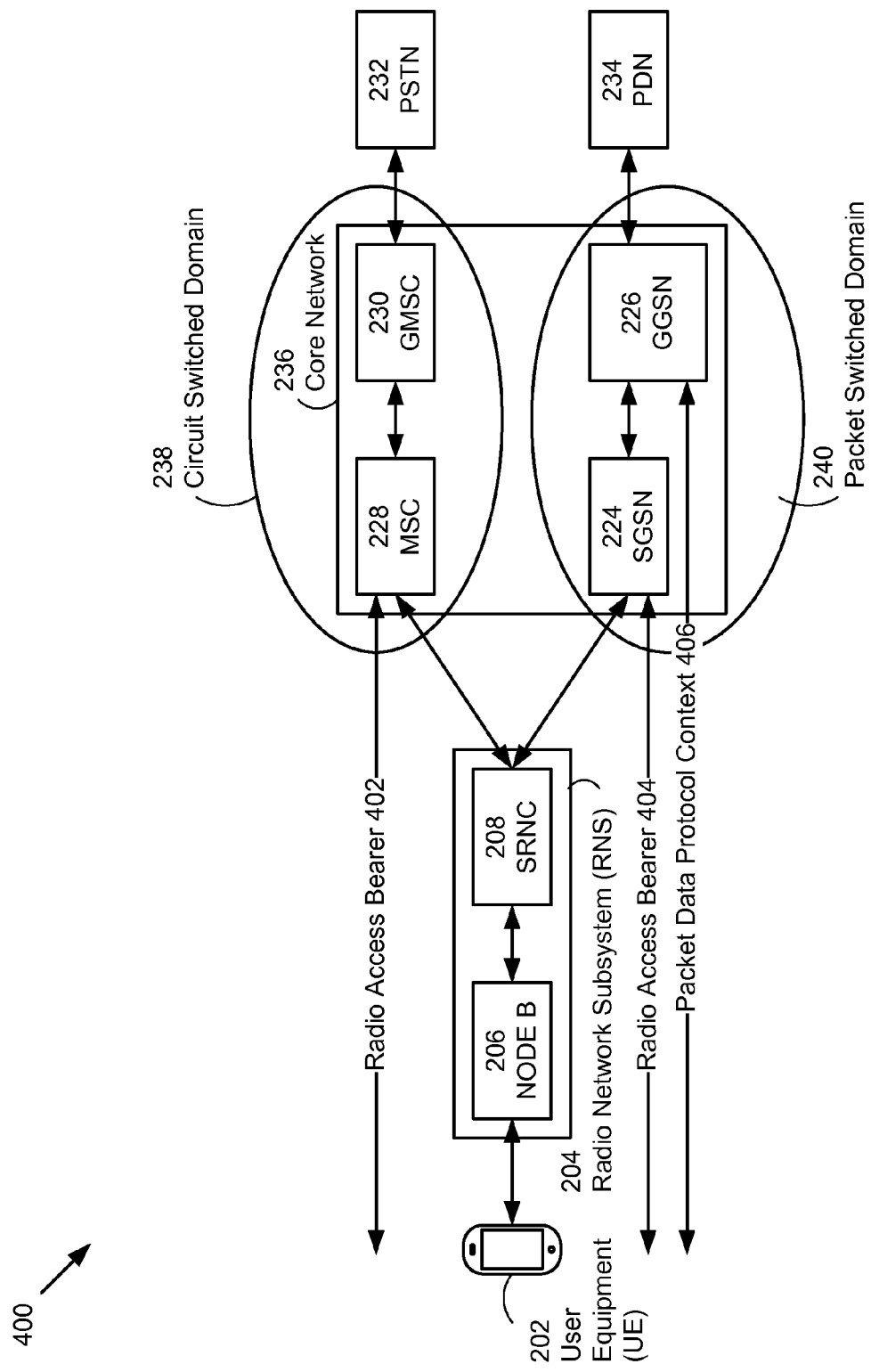
FIG. 4 illustrates a multiple radio access bearer wireless connection including circuit and packet switching.

As illustrated in FIGS. 2 and 4, a UMTS network can include two distinct domains, a circuit switched domain 238 to carry circuit switched traffic (such as voice or transparent data) and a packet switched domain 240 to transport packet data (such as internet connectivity or voice over IP). As shown in FIG. 4, the UE 202 can be simultaneously connected to the circuit switched domain 238 by a radio access bearer 402 to carry voice traffic and to the packet switched domain 240 through a radio access bearer 404 to carry data traffic. A radio access bearer can be considered a channel to transport a circuit switched data stream or a packet switched data stream between the UE 202 and the core network 236 through the RNS 204. The core network 236 can set characteristics of each radio access bearer including data rate and quality of service based on requirements for the data stream transported and on a user's subscription among other criteria. A packet data protocol (PDP) context 406 can provide a packet data connection between the UE 202 and the gateway GPRS support node (GGSN) 226 to support the exchange of internet protocol (IP) packets using the radio access bearer 404 over the wireless access network portion of the connection. The PDP context 406 can include a PDP address, such as an IP address, for the UE 202. The PDP context 406 can be activated by the UE 202 at the session management layer 310, and the radio access bearer 404 can be established and associated with the PDP context 406 to transport data for the UE 202. Once established, data can be sent as a series of layer 3 SDUs, each layer 3 SDU transported through numbered sequences of layer 2 PDUs as described above for FIG. 3.

Figure 5:
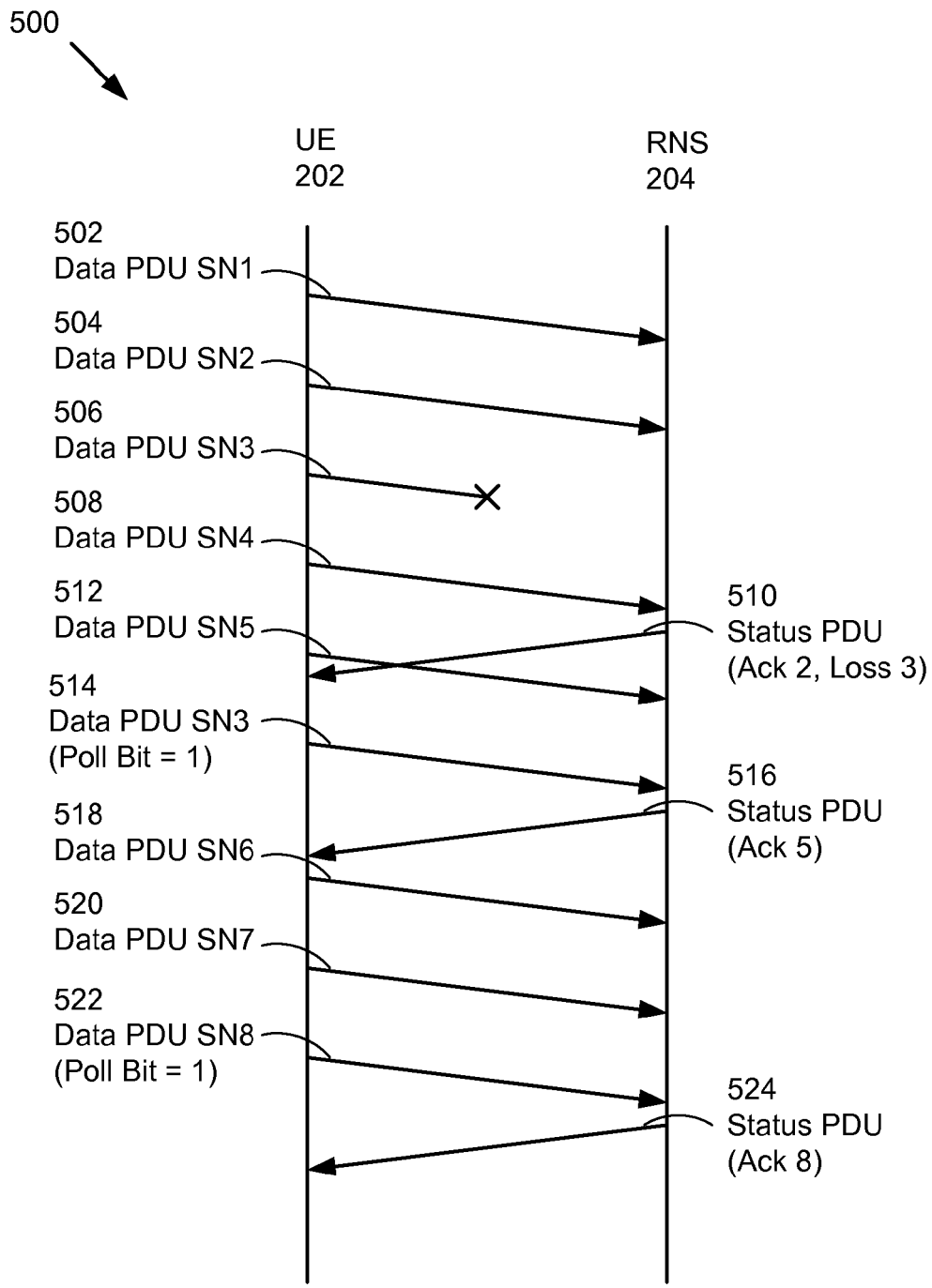
FIG. 5 illustrates a data packet transmission sequence with re-transmission between user equipment (UE) and a radio network subsystem (RNS).

FIG. 5 illustrates a successful transmission of a layer 3 SDU as a series of layer 2 PDUs including a retransmission of one of the layer 2 PDUs. As shown in FIG. 5, an exchange 500 of layer 2 PDUs between the UE 202 and the RNS 204 to transport a layer 3 SDU that includes eight distinct layer 2 data PDUs can occur. Each layer 2 data PDU in the layer 3 SDU can include a unique sequence number (SN). The first two layer 2 data PDUs 502/504 having sequence numbers 1 and 2 can be received correctly at the RNS 204, but the third layer 3 data PDU 506 having sequence number 3 can be lost or corrupted during transmission. When the fourth layer 2 data PDU 508 with sequence number 4 is received correctly at the RNS 204, the RLC layer 2 processing block 306 in the RNS 204 can recognize that the layer 2 data PDU 508 is received out of sequence. In response to this sequence error, the RNS 204 can send a layer 2 status PDU 510 that contains information about the sequence number of the last layer 2 data PDU in the current layer 3 SDU for which all layer 2 data PDUs (up to and including the last layer 2 data PDU) are received correctly. Thus, for the sequence 500 shown in FIG. 5, the layer 2 status PDU 510 can indicate that sequence numbers 1 and 2 have been received correctly and that sequence number 3 has been lost. (Layer 2 data PDU 508 with sequence number 4 has been received correctly but not layer 2 data PDU 506 with sequence number 3, so the layer 2 status PDU 508 with sequence number 4 is not yet acknowledged.) Before the UE 202 receives the layer 2 status PDU 510 indicating a missing layer 2 PDU, the next layer 2 data PDU 512 in sequence can be sent. After receiving the layer 2 status PDU 510, the UE 202 can realize that the layer 2 data PDU 514 was lost or corrupted in transmission and resend the layer 2 data PDU 514 with sequence number 3. The layer 2 data PDU 514 can include a poll bit enabled. Rather than send additional layer 2 data PDUs, the UE 202 can await a response to the polling from the RNS 204. After receiving the layer 2 data PDU 514 with the set poll bit correctly, the RNS 204 can send a second layer 2 status PDU 516 indicating that all data PDUs up to and including sequence number 5 have been correctly received. (The retransmitted layer 2 PDU with sequence number 3 filled the gap. The RNS 204 can respond with the highest sequence number, not necessarily the sequence number of the layer 2 PDU that included the poll bit enabled.) The UE 202 can proceed to send the remaining layer 2 data PDUs 518/520/522 in the layer 3 SDU to the RNS 204. The final layer 2 data PDU 522 with sequence number 8 can also include a poll bit enabled so that the UE 202 can know that the RNS 204 received all of the layer 2 PDUs in the layer 3 SDU correctly. In response to receiving the layer 2 data PDU 522 with the poll bit set, the RNS 204 can send a layer 2 status PDU 524 that indicates that all layer 2 data PDUs up to and including sequence number 8 have been received correctly. As shown in FIG. 5, layer 2 status PDUs can be sent in response to polling by the UE 202 or can be self triggered by the RNS 204. In addition to polling when the last layer 2 data PDU in an SDU is sent, the UE 202 can also poll at the expiration of a poll timer, based on the status of one or more transmission buffers, periodically, or using other local criteria.

Figure 6:
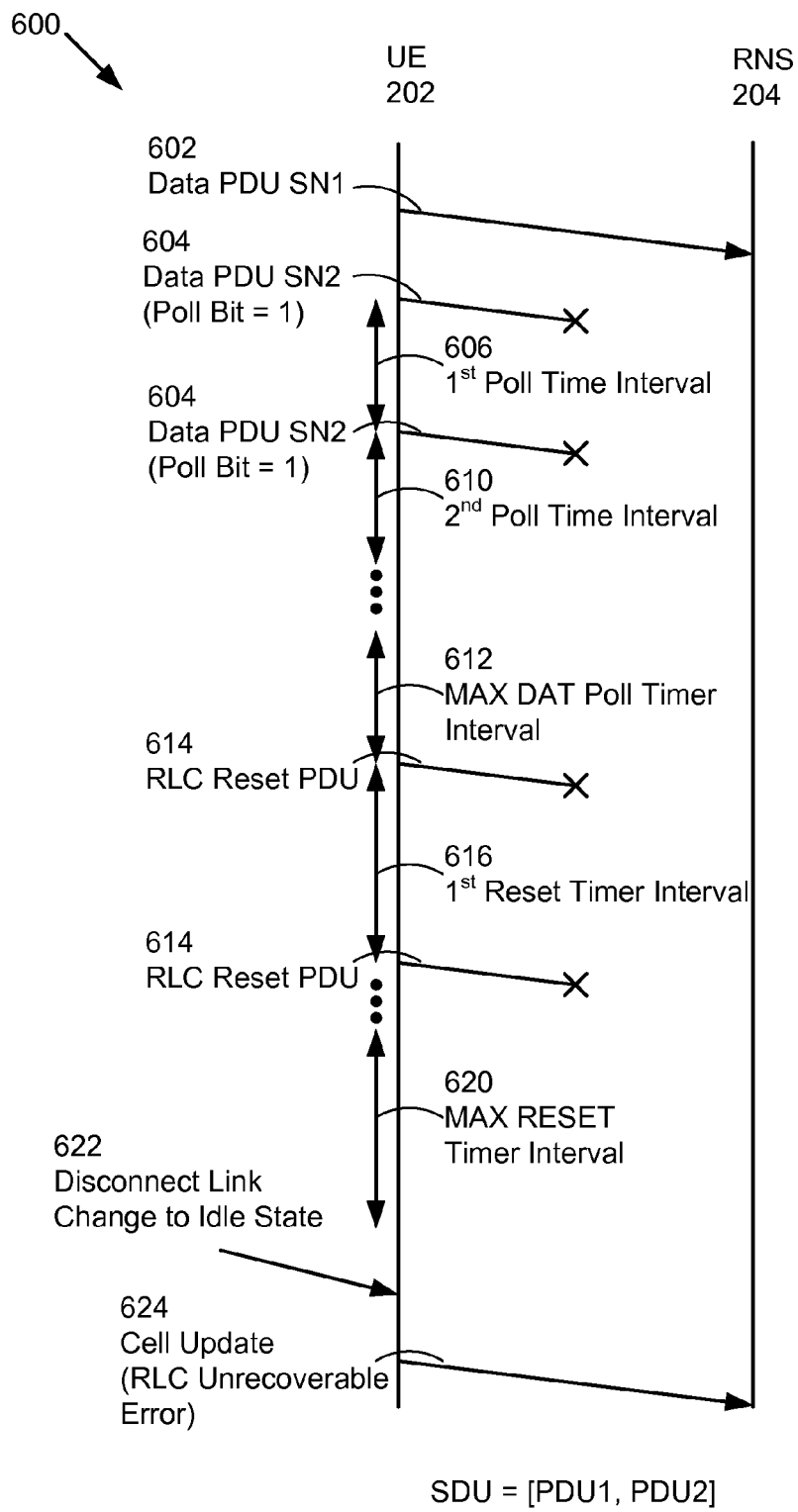
FIG. 6 illustrates a data packet transmission sequence from a UE to an RNS with a disconnection of the link between the UE and the RNS.

FIG. 6 illustrates the UE 202 attempting unsuccessfully to send a short layer 3 SDU that includes two layer 2 data PDUs with no responses received by the UE 202 from the RNS 204. The UE 202 sends a first layer 2 data PDU 602 in the layer 3 SDU with sequence number 1 followed by a second layer 2 data PDU 604 with sequence number 2, where the second layer 2 data PDU 604 includes a poll bit set. While the RNS 204 receives the first layer 2 data PDU 602 correctly, the second layer 2 data PDU 604 is not received correctly by the RNS 204. Slow responses or no response from the RNS 204 in the wireless network to the UE 202 can occur when congestion and scheduling issues arise for a number of reasons. For example, the number of users accessing data connections and the amount of data traffic transported can overwhelm the planned and allocated network capabilities. Initially the UE 202 can retry sending the last layer 2 data PDU 04 if the wireless network appears to be stalled. The UE 202 can set a poll timer when sending the last layer 2 data PDU 604 having the poll bit set, and after a first poll time interval 606, the UE 202 can resend the last layer 2 data PDU 604 again with the poll bit set. The UE 202 can reset the poll timer, and upon expiration of the poll timer, the UE 202 can resend the last layer 2 data PDU 604. This polling can repeat up to a maximum number of polls specified by a parameter MAX DAT provided by the wireless network when establishing the radio access bearer that supports the data connection between the UE 202 and the RNS 204. As shown in FIG. 6, each of the repeated layer 2 data PDU 604 transmissions can be lost or incorrectly received by the RNS 604.

After polling the RNS 204 MAX DAT times, the UE 202 can begin a reset of the RLC layer 2 connection between the UE 202 and the RNS 204. The UE 202 can send an RLC layer 2 reset PDU 614 to the RNS 204 and can wait for an RLC layer 2 reset acknowledgement PDU from the RNS 204. If no layer 2 acknowledgement PDU is received within a first reset timer interval 616, the UE 202 can resend the RLC layer 2 reset PDU 614 to the RNS 204. After resending the RLC layer 2 reset PDU 614 MAX RESET times, the UE 202 can conclude that the RLC layer 2 connection is unable to be recovered. The UE 202 can disconnect 622 the link between the UE 202 and the wireless network by changing from an active connected state to an idle state, thereby releasing the layer 3 RRC connection. Subsequently the UE 202 can send a cell update 624 control message to the wireless network indicating the state change due to an RLC layer 2 unrecoverable error. (The cell update message can be sent on a common control channel between the UE 202 and the wireless network that is separate from the unrecoverable data connection.) By entering the idle state, the UE 202 can disconnect both the data connection experiencing unrecoverable errors on one of the radio access bearers and also any other data or voice connections that can be simultaneously using separate radio access bearers. Thus, a user of the UE 202 can experience a dropped voice call due to an unrelated data stall on a simultaneous data connection when connected through multiple radio access bearers.

Figure 7:
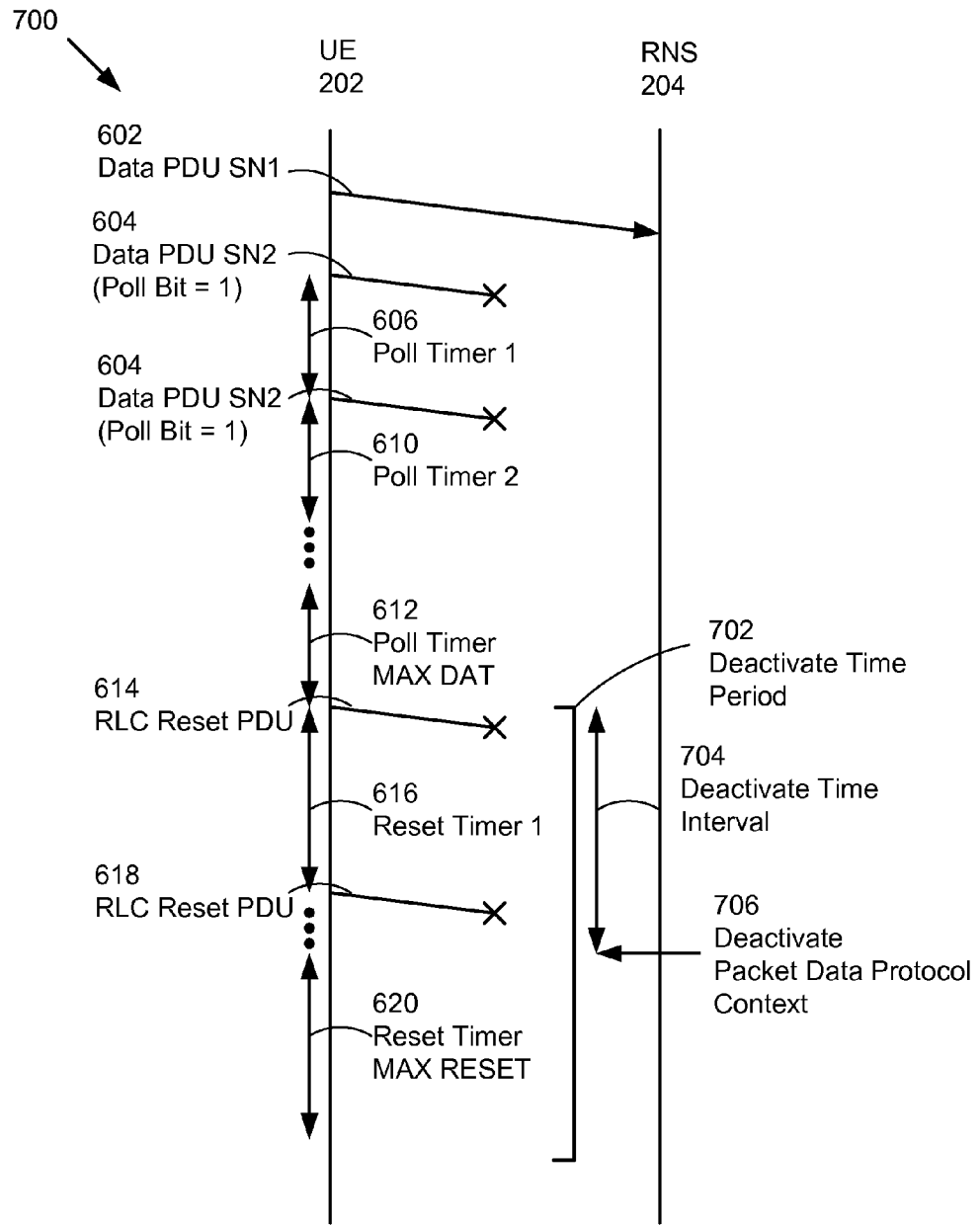
FIG. 7 illustrates a data packet transmission sequence from a UE to an RNS with a packet data protocol deactivation.

FIG. 7 illustrates an alternative method for controlling the UE 202 when connected to a wireless network by multiple radio access bearers that can disconnect an errant data connection while maintaining other simultaneous connections of the UE 202 to the wireless network. As in FIG. 6, the UE 202 can send a layer 3 SDU to the RNS 204 as two separate layer data PDUs 602/604 each with distinct sequence numbers. The second layer 2 data PDU 604 (and last layer 2 data PDU in the layer 3 SDU) can include a poll bit enabled, and the UE 202 can repeatedly send the last layer 2 data PDU 604 MAX DAT times when no acknowledgement is received from the RNS 204. After MAX DAT polls, the UE 202 can start a deactivate timer, and at the expiration of a deactivate time interval 704, the UE 202 can deactivate 706 the packet data protocol (PDP) context associated with the data connection that is not responding. As a result of deactivating the PDP context, the associated radio access bearer can be released by the wireless network without affecting connections through other radio access bearers between the UE 202 and the RNS 204. The UE 202 can thus release radio resources, just as when a user of the UE 202 can end a data connection or voice call independently of each other, without entering an idle state that can disrupt multiple simultaneous connections of the UE 202 to the wireless network. The length of the deactivate time interval 704 can be set so that the PDP context deactivation 706 occurs during a deactivate time period 702 between the end of polling and the end of sending the layer 2 reset PDUs. The UE can avoid disconnecting the radio link 622 by not changing to the idle state as done in FIG. 6.

Figure 8:
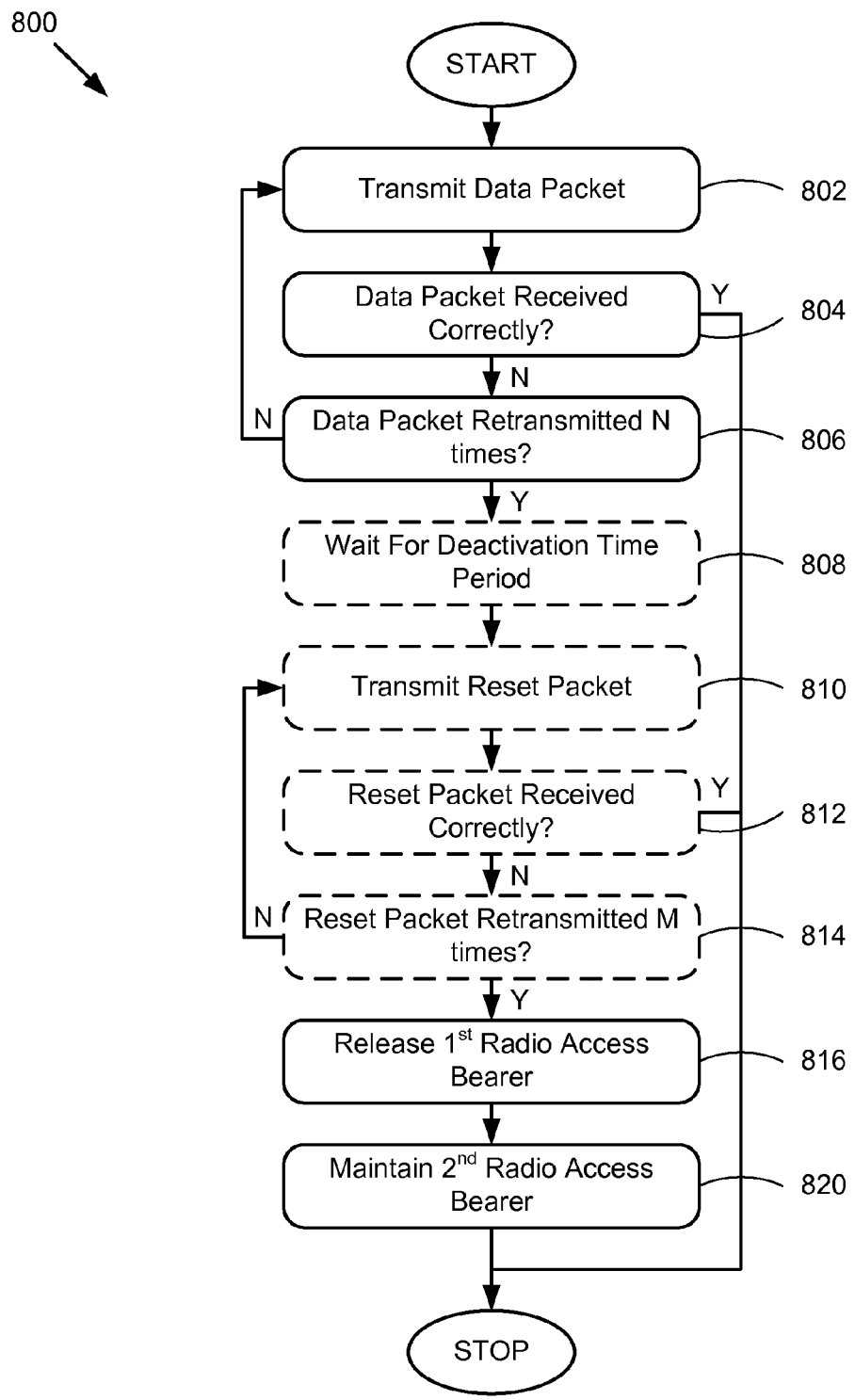
FIG. 8 illustrates a method for controlling a multiple radio access bearer connection between a mobile wireless communication device and a wireless communication network.

Generalizing from the method illustrated in FIG. 7, FIG. 8 outlines a method for controlling a multiple radio access bearer connection between a mobile wireless communication device and a wireless communication network. The mobile wireless communication device can transmit a data packet using a first radio access bearer in step 802. The mobile wireless communication device can determine if the data packet is received correctly by the wireless communication network in step 804. When the data packet is received correctly, the method can terminate. When the data packet is not received correctly, then in step 806, the mobile wireless communication device can determine if the data packet has been retransmitted an integer N number of times. If less than N retransmissions have occurred, then the mobile wireless communication device can repeat the transmitting and determining steps 802, 804 and 806. After N retransmissions without the data packet being received correctly by the wireless communication network, the mobile wireless communication device can release the first radio access bearer on which the data packets are transmitted in step 816, while simultaneously maintaining a second radio access bearer between the mobile wireless communication device and the wireless communication network in step 820. In step 808, the mobile wireless communication device can optionally wait for a deactivation time period before releasing the first radio access bearer. Additional optional steps also provide for transmitting a reset packet after the N data packet retransmissions. In step 810, the reset packet can be transmitted by the mobile wireless communication device to the wireless communication network. The mobile wireless communication device can determine if the reset packet is received correctly by the wireless communication network in step 812. When the reset packet is received by the wireless communication network correctly the method can terminate. If the reset packet is not received correctly, then the mobile wireless communication device can determine if the reset packet has been retransmitted an integer M number of times. If less than M retransmissions have occurred, then the mobile wireless communication device can repeat the transmitting and determining steps 810, 812, and 814. After M retransmissions the mobile wireless communication device can release the first radio access bearer while maintaining the second radio access bearer.

Various aspects of the described embodiments can be implemented by software, hardware or a combination of hardware and software. The described embodiments can also be embodied as computer program code on a computer readable medium for configuring a mobile wireless communication device. The computer readable medium is any data storage device that can store data which can thereafter be read by a computer system. Examples of the computer readable medium include read-only memory, random-access memory, CD-ROMs, DVDs, magnetic tape and optical data storage devices. The computer program medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a mobile wireless communication device, wherein when the mobile wireless communication device is connected to a radio network subsystem in a wireless communication network by a first bidirectional radio access bearer and a second bidirectional radio access bearer simultaneously,
transmitting a data packet on an uplink of the first bidirectional radio access bearer to the radio network subsystem;
retransmitting the data packet when the data packet is not correctly received by the radio network subsystem;
after N retransmissions of the data packet, transmitting a reset packet on the uplink of the first bidirectional radio access bearer to the radio network subsystem;
retransmitting the reset packet when the reset packet is not correctly received by the radio network subsystem; and
after M retransmissions of the reset packet, waiting for a deactivation time period before releasing the first bidirectional radio access bearer while maintaining the second bidirectional radio access bearer.

2. The method as recited in claim 1, wherein the first bidirectional radio access bearer provides a channel to transport packet switched data, and the second bidirectional radio access bearer provides a channel to transport circuit switched data.

3. The method as recited in claim 1, wherein the data packet is a layer 2 data protocol data unit and the reset packet is a layer 2 reset data protocol data unit.

4. The method as recited in claim 3, wherein the layer 2 data protocol data unit includes a poll bit enabled, thereby requesting an acknowledgement from the radio network subsystem that the layer 2 data protocol data unit is correctly received.

5. A mobile wireless communication device, comprising:
a wireless transceiver arranged to transmit to and receive from a radio network subsystem in a wireless communication network signals over multiple radio access bearers; and
a processor coupled to the wireless transceiver, the processor arranged to execute instructions for:
when the mobile wireless communication device is connected to the radio network subsystem by a first radio access bearer and a second radio access bearer simultaneously,
transmitting a data packet on an uplink of the first radio access bearer to the radio network subsystem;
retransmitting the data packet when the data packet is not correctly received by the radio network subsystem;
after N retransmissions of the data packet, transmitting a reset packet on the uplink of the first bidirectional radio access bearer to the radio network subsystem;
retransmitting the reset packet when the reset packet is not correctly received by the radio network subsystem; and after M retransmissions of the reset packet, waiting for a deactivation time period before releasing the first radio access bearer while maintaining the second radio access bearer.

6. The mobile wireless communication device as recited in claim 5, wherein the first radio access bearer provides a channel to transport packet switched data, and the second radio access bearer provides a channel to transport circuit switched data.

7. The mobile wireless communication device as recited in claim 5, wherein the data packet is a layer 2 data protocol data unit and the reset packet is a layer 2 reset data protocol unit.

8. The mobile wireless communication device as recited in claim 7, wherein the layer 2 data protocol data unit includes a poll bit enabled, thereby requesting an acknowledgement from the radio network subsystem that the layer 2 data protocol data unit is correctly received.

9. Computer program product encoded in a non-transitory computer readable medium for controlling a mobile wireless communication device connected to a radio access system in a wireless communication network by a plurality of wireless channels simultaneously, the computer program product when executed by computer performing steps comprising:
transmitting a data packet on a first wireless channel in the plurality of wireless channels to the radio access system;
retransmitting the data packet when the data packet is not correctly received by the radio access system;
after N retransmissions of the data packet, transmitting a reset packet on the first wireless channel to the radio access system;
retransmitting the reset packet when the reset packet is not correctly received by the radio access system; and
after M retransmissions of the reset packet, waiting for a deactivation time period before disconnecting the first wireless channel while maintaining a connection of at least one other wireless channel in the plurality of wireless channels to the radio access system.

10. The computer program product as recited in claim 9, wherein the first wireless channel transports packet switched data, and at least one other channel in the plurality of wireless channels transports circuit switched data.

11. The computer program product as recited in claim 9, wherein the data packet is a layer 2 data protocol data unit and the reset packet is a layer 2 reset data protocol unit.

12. The computer program product as recited in claim 11, wherein the layer 2 data protocol data unit includes a poll bit enabled, thereby requesting an acknowledgement from the radio access system that the layer 2 data protocol data unit is correctly received.

13. A method for controlling at least two simultaneous wireless connections between a mobile wireless communication device and a wireless access network, the method comprising:
at the mobile wireless communication device,
transmitting and receiving circuit switched data over a first wireless connection;
transmitting and receiving packet switched data over a second wireless connection;
determining whether the transmitted packet switched data is received correctly by the wireless access network; and
disconnecting the second wireless connection after waiting for a deactivation time period while retaining the first wireless connection with the wireless access network when the transmitted packet switched data is not received correctly by the wireless access network after N retransmissions of the packet switched data by the mobile wireless communication device, and after M retransmissions of a reset packet when the reset packet is transmitted on the second wireless connection to the wireless access network and is not correctly received by the wireless access network.

14. The method as recited in claim 13, further comprising:
resetting the second wireless connection before the disconnecting of the second wireless connection.

\* \* \* \* \*